United States Patent [19]
Harada et al.

[11] Patent Number: 5,460,636
[45] Date of Patent: Oct. 24, 1995

[54] IMPURITY SCAVENGING SYSTEM

[75] Inventors: Hiroyuki Harada, Tokyo; Tsutomu Koinuma, Urawa; Terufumi Iwata, Yokohama; Michio Nitta, Tokyo, all of Japan

[73] Assignees: Tokico Ltd., Kanagawa; Mitsubishi Corporation, Tokyo, both of Japan

[21] Appl. No.: 159,292

[22] Filed: Nov. 30, 1993

[30] Foreign Application Priority Data

Dec. 1, 1992 [JP] Japan ................... 4-322143

[51] Int. Cl.⁶ ........................................ B01D 19/00
[52] U.S. Cl. ................... 55/227; 55/228; 55/256; 55/257.1; 55/267; 55/270; 55/467; 95/94; 95/186; 95/226; 96/134; 96/181
[58] Field of Search ................ 55/227, 228, 256, 55/257.1, 267, 270, 467; 95/186, 226, 94; 96/181, 134

[56] References Cited

U.S. PATENT DOCUMENTS

| | | | |
|---|---|---|---|
| 2,199,797 | 5/1940 | Hunter | 95/226 |
| 3,335,548 | 8/1967 | Harmon et al. | 96/181 |
| 3,456,428 | 7/1969 | Bichet et al. | 95/226 |
| 3,581,473 | 6/1971 | Ririe, Jr. | 55/256 |
| 3,616,611 | 11/1971 | Gentili | 96/181 |
| 4,155,977 | 5/1979 | Baker | 55/256 |

Primary Examiner—C. Scott Bushey
Attorney, Agent, or Firm—Pearne, Gordon, McCoy & Granger

[57] ABSTRACT

An impurity scavenging system which scavenges impurities of off-gases discharged from a clean room of a production line for semiconductors. The impurity scavenging system has a gas introduction line through which gas to be processed (hereinafter referred as GSP) is discharged, a scavenging unit which stores scavenging liquid, a condenser for condensing vaporized liquid from the scavenging unit, a first pump which pumps the GSP of a discharging line connected with the downstream side of the condenser, a liquid source, a cleaning liquid line which connects the discharging line to a drain and a first valve having ports, including a first port connected with the condenser, a second port connected with the first pump, and a third port connected with one end of the cleaning line another end of which is connected to the drain, thereby selectively enabling a connection from the condenser to the first pump and a connection from the condenser to the cleaning line.

19 Claims, 3 Drawing Sheets

IMPURITY SCAVENGING SYSTEM

FIELD OF THE INVENTION

The invention relates to an impurity scavenging system, more specifically an impurity scavenging system which scavenges impurities of off-gases discharged from a clean room of a producing line for semiconductors.

BACKGROUND ART

Some types of off-gases discharged from a producing line of semiconductors contain impurities, such as gases and particles, which are sometimes harmful to human beings and cause erosion to the equipment of the producing line. Therefore it is necessary to remove the above mentioned impurities from the off-gases by means of a scavenging process and it is also necessary to measure residual impurities of the off-gases after the scavenging process.

For the scavenging and the measuring of the off-gases, the following scavenging system is used in a producing line of semiconductors. The scavenging system scavenges impurities from the air of the clean room, in which the semiconductors are produced, by discharging the air into the scavenging liquid, such as the demineralized water in the scavenging unit, so as to dissolve the impurities into the scavenging liquid. Thus, scavenged impurities in the scavenging liquid are analyzed by the means of microanalysis such as ion chromatography.

In the impurity scavenging system described above, the density of the impurities of the scavenging liquid in the scavenging unit increases during a period of continuous scavenging. Therefore the scavenging unit, the condenser and the pipe lines can be contaminated by the scavenging liquid which contains a high density of the impurities. Some errors in the measurement of the density of the impurities can be caused by this contamination. It requires much effort for cleaning the scavenging system when it is contaminated by impurities in order to avoid the errors in measuring described above.

The scavenging unit should be filled with a specified quantity of new scavenging liquid after the cleaning of the scavenging unit, the condenser and the pipe lines before the starting of the scavenging system. Therefore it is necessary to measure the quantity of the new scavenging liquid by means of an additional measuring means, such as a flow meter or level meter. However, a controlling system for the scavenging system becomes more complicated by the addition of this measuring means.

SUMMARY OF THE INVENTION

It is an object of the present invention to provide an impurity scavenging system which has the superior performance and aspects listed hereinbelow.

1. Construction of a scavenging unit, a condenser and pipe lines are which are suited for cleaning.

2. A scavenging unit which can be supplied with new scavenging liquid in a specified quantity before a starting of the scavenging system.

3. A contamination of impurities which can be measured exactly with high accuracy.

To accomplish the above object, the present invention discloses an impurity scavenging system comprising: a gas introduction line through which gas to be processed (hereinafter referred as GSP) can be discharged; a scavenging unit, which stores liquid which scavenges impurities, and into which the GSP supplied through the gas introduction line is discharged; a condenser which liquefies the liquid which is vaporized in the scavenging unit and returns the liquid into the scavenging unit; and a first pumping means which pumps the GSP of a discharging line connected with the downstream side of the condenser; and wherein the impurity scavenging system is further comprising a liquid supplying means which supplies the liquid such as demineralized water into the scavenging unit; a cleaning liquid line which connects the discharging line to a drain; and a first valve having ports, two of which are respectively connected to the condenser and the pumping means in the discharging line, one of which is connected to one end of the cleaning line wherein the other end is connected to the drain.

According to the above structures, the liquid for cleaning which is supplied from the scavenging unit, is discharged into the drain through the condenser, the first valve and the cleaning line in the case where two of the ports of the first valve connects to the condenser and the cleaning line. The impurity scavenging unit, the condenser and the lines through which the liquid is discharged are cleaned by the liquid. Therefore, it is possible to exactly measure the density of the impurities of the GSP. Thus, the process of cleaning is accomplished by the operation of the first valve and the supplying of the liquid from the liquid supplying means is easily.

DESCRIPTION OF THE EMBODIMENTS

Figure 1:
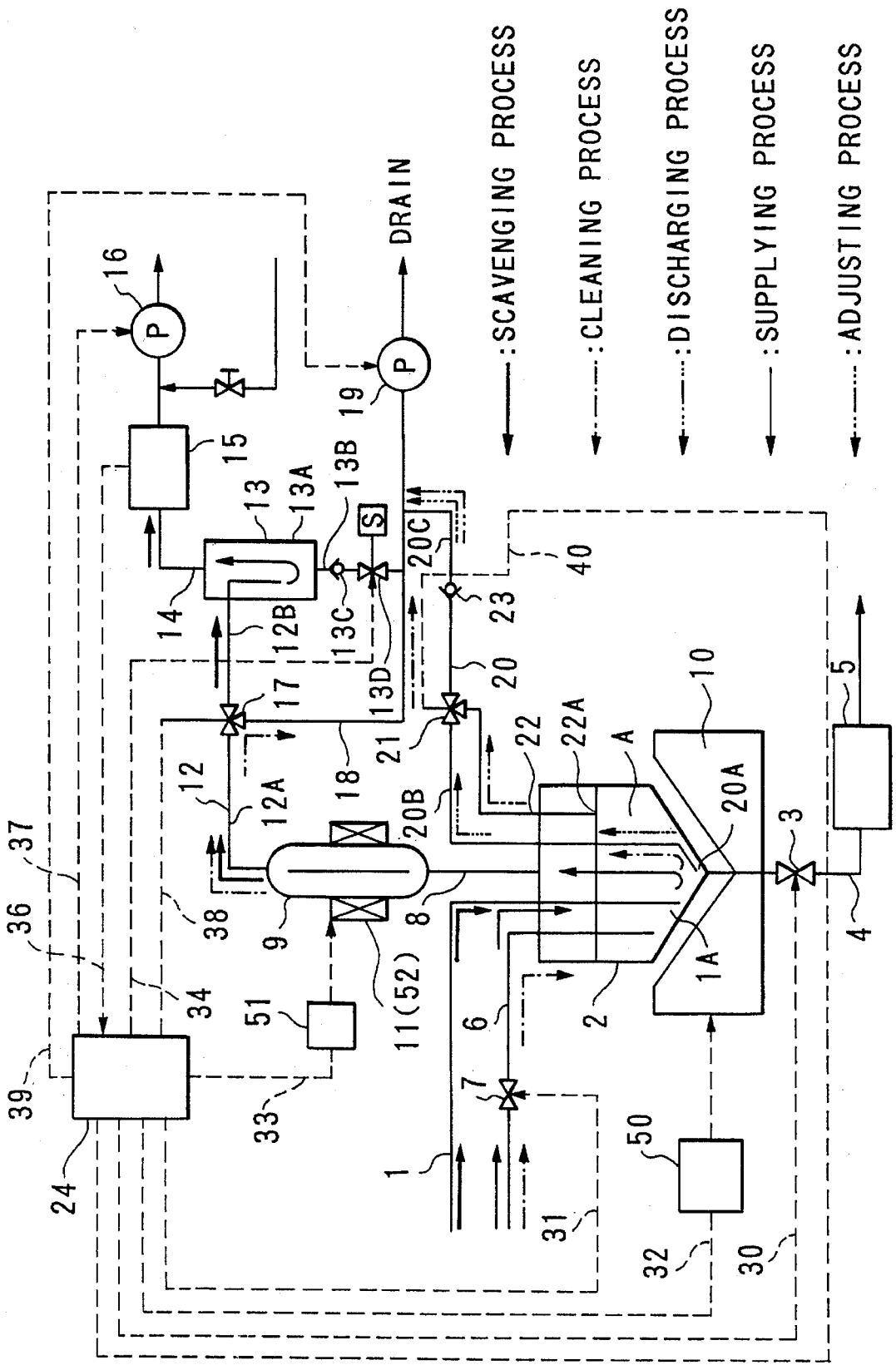
FIG. 1 is a piping arrangement diagram of a first embodiment of the invention.

Various embodiments of the invention will be described hereinbelow with reference to the drawings. It should be noted that like or similar components and parts are designated by the same or like reference numerals throughout the drawings, and the description of the like or similar components and parts will be simplified or omitted to avoid repetition.

First Embodiment

Referring to FIG. 1, numeral 1 indicates an introduction line in which GSP, such as cleaning air and impurities exhausted from a producing line for semiconductors from the clean room are supplied. The introduction line 1 is arranged in the upper part of the impurity scavenging unit 2. The head part 1A of the introduction line 1 is directed downward and placed close to the bottom part of the impurity scavenging unit 2. Under the arrangement of the introduction line 1 and the head part 1A described above, the introduction line 1 discharges the GSP under the specified surface of the scavenging liquid A stored in the impurity scavenging unit 2, therefore bubbling occurs in the scavenging liquid A. The scavenging liquid A scavenges the impurities of the GSP by the above described method for bubbling.

The impurity scavenging unit 2 stores the scavenging liquid A, such as demineralized water. The discharging line 4 is connected to the bottom part of the impurity scavenging unit 2. The solenoid operated valve (hereinafter referred as SOV) 3 is arranged in the discharging line 4. The impurity analyzer 5 which measures the impurity of the scavenging liquid A supplied from the scavenging unit 2 through the discharging line 4 is arranged at the end of the discharging line 4.

The scavenging liquid supplying line 6, through which the liquid as the scavenging liquid and the cleaning liquid is supplied, and the connecting line 8 through which the GSP bubbled in the scavenging liquid A is discharged into the condenser 9, are respectively connected in the upper part of the scavenging unit 2. The SOV 7 is arranged in the scavenging liquid supplying line 6.

The heating unit 10, which heats the scavenging liquid A in the scavenging unit 2, is arranged in the bottom part of the scavenging unit 2. The heating unit 10 saturates the vaporized scavenging liquid into the GSP so as to scavenge the impurities into the scavenging liquid in high efficiency by heating the entire part of the bottom part of the scavenging unit 2. The vaporized scavenging liquid A contained in the GSP scavenges the residual impurities, which have not been scavenged by the scavenging liquid of the scavenging unit 2, by means of condensation in the condenser 9. The scavenging liquid is supplied into the scavenging unit 2 by opening the SOV 7, and stopped by closing the SOV 7.

The cooling unit 11 which actively cools the GSP discharged from the scavenging unit 2 through the connecting line 8, is arranged in the upward portion of the scavenging unit. The vaporized scavenging liquid contained in the GSP condenses by the cooling of the condenser 9, and then flows down through the connecting line 8 into the scavenging unit 2.

The discharging line 12, through which the GSP from the condensate 9 flows, is arranged in the top part of the condenser 9 and one end thereof is connected to the reservoir 13. The reservoir 13 consists of the tank 13A which has a specific capacity, the drain discharging line 13B connected to the bottom part of the tank 13A, the check valve 13C and the SOV 13D arranged in series in the discharging line 13B.

The one end of the discharging line 12 is inserted into the inside of the tank 13A. The vapor and/or mist of the scavenging liquid contained in the GSP which is supplied by the discharging line 12 into the reservoir 13, is separated from the GSP. After the above separating process the GSP is discharged into the discharging line 14 connected to the top end of the tank 13A.

The mass flow meter 15 which measures the flow rate of the GSP and the vacuum pump 16 which introduces the GSP into the impurity scavenging system through the introducing line 1 are arranged in series in the discharging line 14.

The discharging line for the cleaning liquid which is supplied by the liquid supplying line will be explained hereinbelow.

The SOV 17 is arranged in the discharging line 12 between the condenser 9 and the reservoir 13. The SOV 17 has three ports two of which are connected to each other. Two ports are arranged in the line 12. The remaining one port of the SOV 17 is connected to the end of the cleaning line 18.

The discharging line 13B of the reservoir 13 is connected to the cleaning line 18. The discharging pump 19 is arranged on the downstream side of the connecting point of the discharging line 13B and the cleaning line 18. The discharging line 20 for the cleaning liquid is connected to the cleaning line 18 on the upstream side of the discharging pump 19.

The introduction end 20A of the discharging line 20 is arranged in the bottom part of the scavenging unit 2 so as to discharge the entire amount of the liquid contained in the scavenging unit 2, through the cleaning line 18 and the discharging line 20. The SOV 21 is arranged in the discharging line 20. The SOV 21 has three ports two of which are connected to each other. Two of the ports of the solenoid valve 21 are connected to the discharging line 20, the remaining port is connected to the end of the controlling line 22. The check valve 23 is arranged in the discharging line 20 on the downstream side of the SOV 21. The introduction end 22A of the controlling line 22 is arranged in the scavenging unit 2 at the height of the face of the scavenging liquid store in the scavenging unit 2.

The numeral 24 indicates the controlling unit which controls the SOVs 3, 7, 13D, 17 and 20, the heater 10, the cooling unit 11, the mass flow meter 15, the vacuum pump 16 and the discharging pump 19. The controlling lines 30 to 40 indicated by the dotted lines in FIG. 1 are arranged between the controlling unit 24 and the above objects to be controlled. The data measured by the mass flow meter 15 is transported into the controlling unit 24 through the line 36. The controlling signals from the controlling unit 24 are transported into the SOVs 3, 7, 13D, 17 and 20, the heater 10, the cooling unit 11, the vacuum pump 16 and the discharging pump 19 through the lines 30, 31, 32, 33, 34, 35, 37, 38, 39 and 40.

The numeral 50 indicates the thermal control unit for controlling the heating unit 10. The numeral 51 indicates the thermal control unit for controlling the cooling unit 11.

The basic operation of the impurity scavenging system controlled by the controlling unit 24 will be explained hereinbelow.

I. The step of the cleaning process (the flow routes of the liquid are indicated by the single dotted arrows in FIG. 1)

During the cleaning process, the SOV 3 is closed and the line 12A and the cleaning line 18 are connected each other by the SOV 17. The demineralized water, as the cleaning liquid from the supplying line 6, is pumped into the scavenging unit 2 and is used to wash it. The demineralized water which is supplied, is then stored in the impurity scavenging unit 2 until soon beginning to overflow. By means of overflowing, the demineralized water is discharged through the connecting line 8, the condenser 9, the line 12A, the SOV 17 and the washing line 18, into a drain. The flow line through the impurity scavenging unit 2, the connecting line 8, the condenser 9, the line 12A, the SOV 17 and the cleaning line 18 is thus filled with the newly supplied demineralized water and is thus washed.

II. The steps of the discharging process (the flow routes of the liquid are indicated by the triple dotted arrows in FIG. 1)

After the operations of the cleaning process, the SOV 7 is closed, and the regions 12A and 12B of the line 12 are connected into the SOV 17, the regions 20B and 20C of the liquid adjusting line 20 are connected to the SOV 21. The demineralized water of the impurity scavenging unit 2 is discharged into a drain through the region 20B of the discharging line 20, the SOV 21, the region 20C of the cleaning liquid discharging line 20 and the cleaning line 18, by means of pumping from pump 19.

III. The step of the supplying process (the flow routes of the liquid are indicated by the fine solid arrows in FIG. 1)

After the operations of the discharging process, the SOV 7 opens the supplying line 6. Therefore the demineralized water, as the scavenging liquid, is supplied through the supplying line 6 to the scavenging unit 2 by means of the vacuum pump 19 and is stored here. This controller 24 maintains the above-described supplying of the demineralized water until the scavenging unit 2 is filled with the demineralized water. The quantity of the demineralized water is controlled by the amount supplied by the vacuum pump 19.

IV. The steps of the adjusting process (the flow routes of the liquid are indicated by the double dotted arrows in FIG. 1)

After the supplying of the demineralized water the SOV 7 closes the supplying line 6, and SOV 21 connects the lines 20 and 22. Therefore, the demineralized water over the height of the introduction end 22A of the liquid adjusting line 22 is discharged through the liquid adjusting line 22, the SOV 21, the region 20C of the liquid adjusting line 20 and the cleaning liquid discharging line 18, into a drain by means of the vacuum pump 19. The above discharging goes on while the surface of the demineralized water in the impurity scavenging unit 2 is higher than the introduction end 22A of the line 22. By this means of discharging, the demineralized water as the scavenging liquid A is stored in the scavenging unit 2 at the specified surface level.

V. The steps of the scavenging process (the flow routes of the liquid are indicated by the bold solid arrows in FIG. 1)

1. The cleaning air and the off-gases discharged from the producing line of the semiconductors (GSP) are pumped into the scavenging unit 2 by means of the vacuum pump 16 controlled by the controller 24. In this process, the heater 10 and the cooling unit 11 are switched ON. The scavenging liquid A in the scavenging unit 2 is bubbled by the GSP supplied, and scavenges the impurities in the GSP. The GSP passed through the scavenging liquid A is discharged into the condenser 9 through the connecting line 8. The vaporized scavenging liquid A contained in the GSP is cooled and condensed in the condenser 9 by the cooling unit 11. The vaporized scavenging liquid A condenses around the nucleating centers such as the mist particles of the scavenging liquid A or unscavenged impurities and grows up and flows down to the scavenging unit 2 through the connecting line 8 by means of gravity. Thus the impurities are rescavenged by the condensation of the vaporized scavenging liquid A. The GSP passed through the condenser 9 is then discharged into the drain through the discharging line 12, the reservoir 13, the discharging line 14 and the mass flow meter 15 in the line 14 by means of the pump 16. The efficiency of the scavenging in the condenser 9 increases by increasing the contents of the vaporized scavenging liquid A by which is accomplished by heating the scavenging liquid A of the scavenging unit 2.

2. The mass flow meter 15 measures the discharging rate of the GSP through the line 12, and transports the signal of the discharging rate into the controller 24 by the line 36. The controller 24 integrates the quantity of the GSP which discharges through the line 12 and turns OFF the heater 10, the cooling unit 11 and the vacuum pump 16 in the case where the integrated quantity coincides with the specified quantity.

3. After the passage of a specified period from the end of the process 2 described above, all of the scavenging liquid A in the scavenging unit 2 flows down to the impurity measuring means 5 through the opening of the SOV 3. The impurity scavenging means 5 measures the entire quantity of the impurities in the scavenging liquid A.

Steps I to V described above are repeatedly conducted in sequence. In the case of the cleaning the scavenging unit 2, the line 8, the condenser 9, the line 12A, the SOV 17 and the line 18 is not necessary and the steps III to V are conducted repeatedly after the SOV 3 is closed.

The demineralized water, as the cleaning liquid supplied from the supplying line 2, is discharged through the scavenging unit 2, the connecting line 8, the condenser 9, the discharging line 12A, the SOV 17 and the cleaning line 18 into the drain. Therefore, the lines, through which the demineralized water as the scavenging liquid is discharged, are cleaned and are in a condition which is suitable for an exact measurement of impurities.

In the process IV, the surface of the scavenging liquid A of the scavenging unit 2 is set at the specified level automatically without any additional measuring means or controlling means, because it is possible to discharge the scavenging liquid A through the liquid adjusting line 22 only when the surface of the scavenging liquid A in the scavenging unit 2 is higher than the introduction end 22A of the liquid adjusting line 22. Thus the scavenging liquid A is stored in the scavenging unit 2 at the specified surface level before the starting of the scavenging process without any complications. Furthermore it is possible to operate the scavenging system easily at the cleaning process. The operation for cleaning comprises the process of turning the SOV 17 so as to connect the line 18 into the line 12 and the process of discharging the demineralized water into the scavenging unit 2 from the supplying line 6. Therefore, it is easy to clean the scavenging system without any difficulties.

In the case where the GSP contains steam (vapor of the scavenging liquid), it is possible to keep the quantity of the scavenging liquid A in the scavenging unit 2 at a constant by controlling the cooling unit 11 of the condenser 9 maintaining the temperature in the condenser 9 at the temperature T0 whereat the steam contained in the original GSP is saturated. The scavenging unit 2 can scavenge much GSP by this operation, because the quantity of the scavenging liquid A in the scavenging unit 2 is constant at the temperature T0. It is possible to catch the rare impurity of the GSP by increasing the concentration of impurities, of the scavenging liquid, to which the impurity analyzer 5 is sensitive. In the case where the temperature is higher than T0 the scavenging liquid in the scavenging unit 2 decreases through the vaporization of the scavenging liquid into the GSP, and therefore the density of the scavenging liquid increases. In contrast, in the case where the temperature is lower than T0 the scavenging liquid in the scavenging unit 2 increases by the additional liquid which originated from the condensed steam contained in the GSP, and therefore the density of the scavenging liquid decreases.

Thus, it is possible to control the concentration of the impurities of the scavenging liquid to the point whereat the impurity analyzer 5 is sensitive. It is also possible to recover the quantity of the scavenging liquid A, decreased by the sampling through the opened SOV 3, by recovering the scavenging liquid originating from the steam contained in the GSP and, therefore, additional scavenging liquid is not needed. Therefore, the scavenging system of the embodiment is suitable for continuously monitoring the clean room's environment and the off-gases. The concentration of the steam contained in the GSP is measured by the hygrometer and the temperature gauge and controlled by the cooling unit 9 and the heater 11. It is possible to sample the scavenging liquid A automatically by detecting the passing of the surface of the scavenging liquid A by passing the liquid through the introducing end 22A of the line 22A and switching of the SOV 3 controlled by the controlling unit 24. The impurities in the surface of the passing scavenging liquid can be detected by the micromanometer and the source of pressure such as the gas supplier which supplies fine nitrogen.

The cooling in the condenser 9 is not limited by the active cooling unit 11 of this embodiment, and it is possible to cool the scavenging liquid A in the condenser 9 passively.

To measure the rare impurities in the GSP, it needs more GSP to be supplied into the scavenging liquid A. The following structures of the scavenging system are recommended to avoid the extension of the period for supplying more GSP. The therm control unit 52 which can heat and cool the condenser is arranged to take the place of the cooling unit 11 so as to heat and condense the scavenging liquid A in the scavenging unit 2 for the predetermined period together with the heater 12.

The operation of the above heating process will be described hereinbelow with respect to the above described scavenging process V.

1'. The vacuum pump 16 pumps the cleaning air and the gases from the clean room (not shown), as GSP, into the impurity scavenging unit 2 through the introducing line. The heater 10 of the scavenging unit 2 starts heating and the thermal control unit 52 starts cooling. The GSP bubbles the scavenging liquid A of the scavenging unit 2, and therefore the impurities contained in the GSP dissolves into the scavenging liquid A. The GSP through the scavenging liquid is discharged into the condenser 9 through the connecting line 8. The vaporized scavenging liquid contained in the GSP is cooled by the thermal controller 52 of the cooling unit 9 and condensed. The condensed scavenging liquid flows down by means of the gravity and returns to the scavenging unit 2 through the connecting line 8. The GSP separated from the vaporized scavenging liquid is discharged into the drain by the pumping of the vacuum pump 16 through the line 12, the reservoir 13, the line 14 and the mass flow meter 15 in the line 14.

2'. The mass flow meter 15 measures the flow rate of the GSP and transports the data of the flow rate into the controlling unit 24 through the discharging line 36. The control unit 24 integrates the quantity of the GSP discharged through the line 12 and stops the vacuum pump 16 when the integrated quantity coincides the with the predetermined data. After the passage of a specified period, the heater 10 begins heating to vaporize the scavenging liquid A of the scavenging unit 2, the thermal control unit 52 also begins heating so as not to condense the vaporized scavenging liquid A of the condenser 9, and thereby the vaporized scavenging liquid A is discharged into the reservoir 13 through the line 12 and condensed again at the reservoir 13. As a result of the above vaporization, the scavenging liquid A of the scavenging unit 2 is condensed. After the passage of a specified period for the above described condensation, the heater 10 and the thermal controller 52 is turned to OFF.

3'. The entire scavenging liquid A of the scavenging unit 2 is discharged into the impurity analyzer 5 through the opened SOV 3 and the line 4. The impurity analyzer 5 integrates the total quantity of the impurities from the passage of the entire quantity of scavenging liquid A from the scavenging unit 2. The analysis by the impurity analyzer 5 should be modified according to the condensing process at the step 2' described above.

Because the scavenging liquid A, containing the impurities is condensed by the steps 1' to 3' described above, the impurity analyzer 5 is sensitive to impurities even in the case where the impurities contained in the GSP are very low. Under these circumstances, the period for the scavenging becomes shorter.

The condensation of the scavenging liquid A described above is accomplished at the state where the vacuum pump 16 is stopped. This state which is suitable for the condensation is not limited by the case above. In another state where the introduction line 1 is separated from the pumping of the vacuum pump 16 by the additional valve (not shown) in the introduction line 1, the condensation described above is also accomplished. It is also possible to incline the line 12 so as to introduce the scavenging liquid flowing in the line 12, into the reservoir 13.

Furthermore, the connecting line 8 may be omitted for simplification of the structure of the scavenging system.

Second Embodiment

Figure 2:
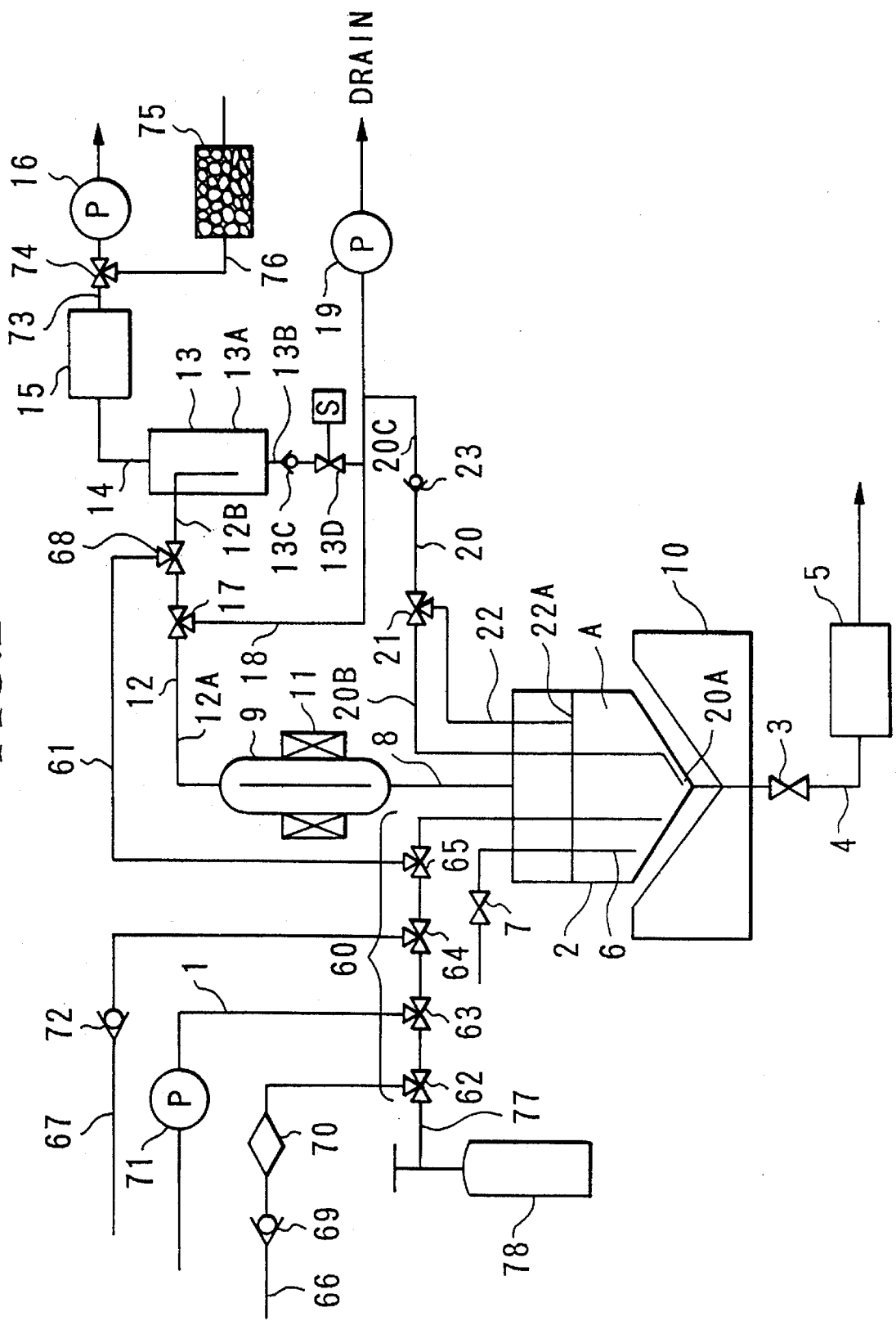
FIG. 2 is a piping arrangement diagram of a second embodiment of the invention.

With reference to FIG. 2, the second embodiment will be described. The components in FIG. 2 like or similar to the first embodiments are indicated by the same numerals in order to simplify the explanation.

In the second embodiment, the introducing line 1 of the first embodiment is replaced by the introducing line 60 in which the SOVs 62 to 65 each of which has three ports are arranged in series. The line 61 is arranged to connect one of the ports of the SOV 65 and one of the ports of the SOV 68 arranged in the region 12B of the line 12. The discharging end of the introduction line 1 through which the off-gases from the producing line of semiconductors is connected to one of the ports of the SOV 63. The discharging end of the line 66, through which the inert gas such as nitrogen is supplied, is connected to one of the ports of the SOV 62. The discharging end of the line 67, through which the non-toxic GSP which has the same pressure is discharged, is connected to one of the ports of the SOV 64. The check valve 69 to avoid back flowing, and the filter unit 70 to filtrate the particles are, arranged in the line 66. The pump 71 which pumps the GSP from the clean room is arranged in the line 1. The check valve 72 in order to avoid back flowing, is arranged in the line 67.

The SOV 74 is arranged in the line 73 which connects the mass flow meter 15 and the vacuum pump 16. One of the three ports of the SOV 74 is connected to the toxicant scavenging unit 75 by the line 76. The toxicant containing scavenging unit 75 is specifically a filter comprising activated charcoal or a scrubber, in which the scavenging liquid such as water is sprinkled in order to scavenge the toxicant.

The line 77 arranged at one end of the line 60 is connected, in a replaceable manner to the gas bomb 78 in which the toxic gases used in the production line of semiconductors, such as silane, arsine, and phosphine for coating a surface of semiconductor are contained.

The characteristics of the scavenging system of the second embodiment will be described hereinbelow.

(1) in the case where a GSP is replaced by another species, such as a toxicant gas, after the period of scavenging for the usual GSP, the impurity scavenging system is operated, in the following steps by controlling the SOVs by means of the control unit 24. The inert gas supplied through the gas supplying line 66 and the first SOV 62 is introduced into the introducing line 60 and discharged into the environment of the scavenging system through the SOVs 63 to 65, the bypass line 61, the SOV 68, the line 12, the reservoir 13, the line 14, the mass flow meter 15, the line 73, the SOV 74 and the vacuum pump 16. Thus the inert gas supplied from the supplying line 68 is purged almost entirely entire of the gases in the introducing line 60.

The scavenging unit 2, the condenser 9 and the lines in the scavenging system are cleaned by the demineralized water as which is the cleaning liquid in line with the operations of the steps I to VI in the first embodiment.

The gas which is measured and scavenged the latest, is toxic, and the inert gas which contains the toxic gases from the latest operation is discharged through the SOV 65, the bypass line 61, the SOV 68, the line 12, the reservoir 13, the line 14, the mass flow meter 15, the line 73 and the SOV 74 into the toxic scavenging unit 75 by connecting the port connected with the line 73 of the SOV 74 to the port connected with the line 76.

(2) After the above purging of the line 60 by the inert gas, the toxic gas, to be measured next, is introduced from the toxic gas bomb 78 into the introducing line 60. The toxic gas discharged through the SOV 65, the bypass line 61, the SOV 68, the line 12, the reservoir 13, the line 14, the mass flow meter 15, the line 73 and the SOV 74 into the toxic scavenging unit 75, purges the inert gas. After the above purging by the toxic gas, the toxic gas is introduced into the impurity scavenging unit 2 through the SOV 65 by connecting the port of the SOV 65, which is connected with the line 77, with the port which is connected with the scavenging unit 2. The toxic gas, as the GSP of this time, thus introduced into the scavenging unit 2, is scavenged and measured by the processes similar to that of processes III to V of the first embodiment.

After the above measuring of the toxic gas, the above process (1) is repeated to purge the toxic gas in the line 60 by the inert gas and the another toxic gas to be measured next is introduced from another toxic gas bomb into the introducing line 60. The toxic gas discharged through the SOV 65, the bypass line 61, the SOV 68, the line 12, the reservoir 13, the line 14, the mass flow meter 15, the line 73 and the SOV 74, into the toxic scavenging unit 75 which purges the inert gas. After the purging, the toxic gas, to be measured next, is introduced into the scavenging unit 2 through the introduction line 60.

In the case where the GSP is not toxic, after the process of supplying the inert gas to the introduction line 60, and the process of supplying the GSP to the introduction line 60 and the bypass line 61, the GSP is introduced into the impurity scavenging unit 2 similar in a manner to that in steps (1) and (2).

In the second embodiment, the SOVs 62 to 64 are arranged in the introduction line 1 in series, and the line 66 for supplying inert gas, the line 67 for supplying GSP and the line 68 for toxic gas are respectively connected to the SOVs 62 to 64. Therefore, it is possible to entirely purge the residual gases in the scavenging system through the use of the inert gas supplied from the line 66. Since the residual gas does not remain in the lines and is not mixed with the GSP, the GSP of the scavenging process is not confused, and the impurities contained in the GSP are scavenged and measured exactly.

Further, in the second embodiment, the toxic scavenging unit 75 scavenges the toxicant contained in the gases timely supplied in a timely manner through the bypass line 61, the lines 12 and 14 via connecting the port of the SOV 74 which is connected with the line 73 to the port of the SOV 74 which in turn is connected with the line 76 so as not to discharge the toxicants into the atmosphere. Therefore, it is possible to minimize the damage to the human environment.

Third Embodiment

Figure 3:
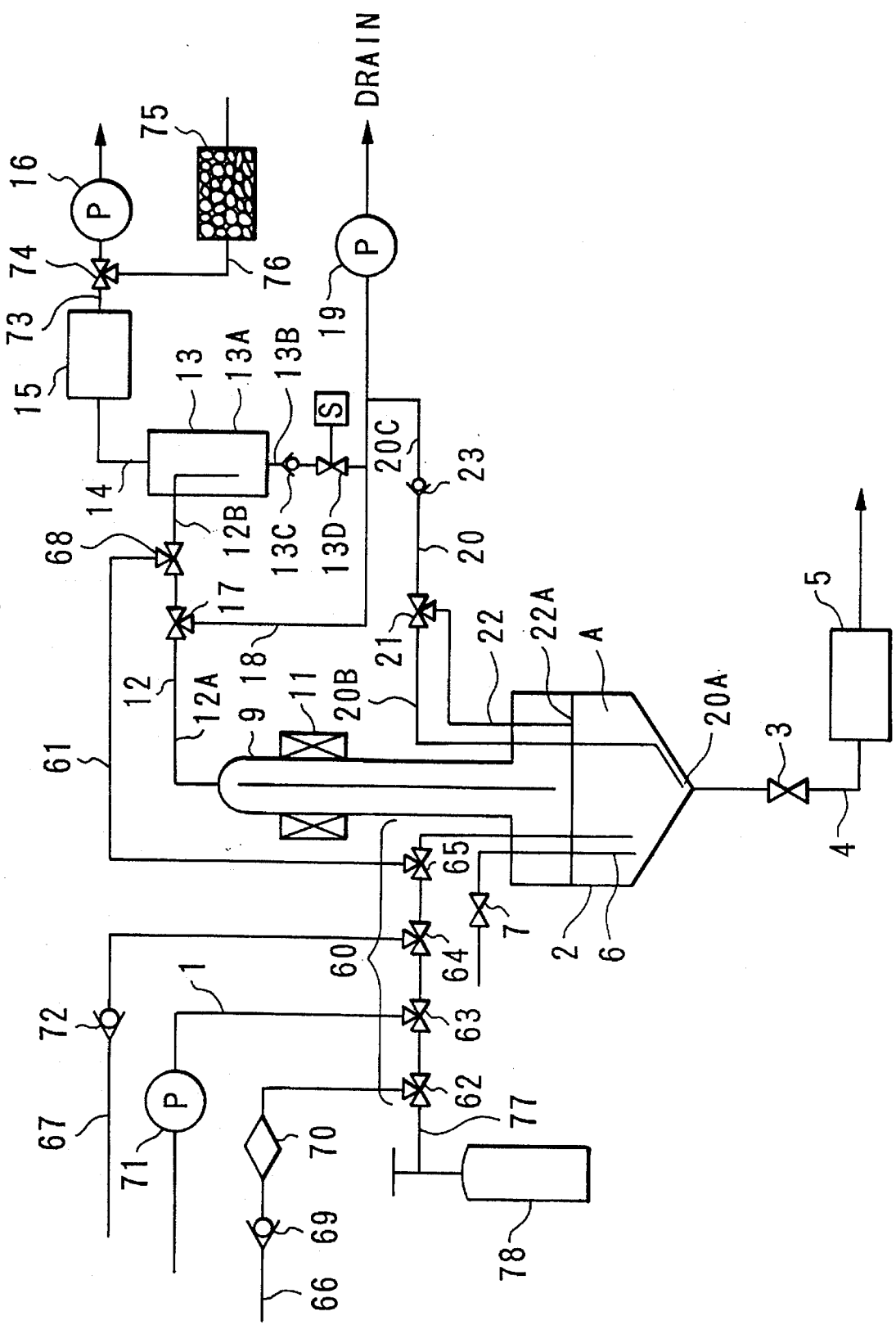
FIG. 3 is a piping arrangement diagram of a third embodiment of the invention.

Referring to FIG. 3, the third embodiment will be described. The components in FIG. 3 which are identical or similar to the first and second embodiments are indicated by the same numerals in order to simplify the explanation. In the third embodiment, the condenser 9 is directly connected with the scavenging unit 2, and the heater 10 which heats the scavenging unit 2 in the first and second embodiments is omitted to simplify the structures.

What is claimed is:

1. An impurity scavenging system comprising:
    a gas introduction line through which gas to be processed is supplied;
    a scavenging unit, which stores liquid which scavenges impurities, into which the gas to be processed, supplied from said gas introduction line, is discharged;
    a condenser which condenses vaporized liquid which is vaporized in said scavenging unit and returns condensed liquid into said scavenging unit;
    a first pumping means which pumps said gas to be processed through a discharging line arranged in the downstream side of said condenser; and
    said impurity scavenging system further comprising a liquid supplying means which supplies cleaning liquid into the scavenging unit;
    a cleaning liquid line which connects the discharging line and a drain; and
    a first valve having ports, including a first port connected with the condenser through the discharging line, a second port connected with the first pumping means through the discharging line, and a third port connected with one end of said cleaning line another end of which is connected to the drain, thereby selectively enabling a connection from said condenser to said first pumping means and a connection from said condenser to said cleaning line.

2. An impurity scavenging system in accordance with claim 1, further comprising a measuring means which measures density of the impurities scavenged by the scavenging liquid of the scavenging unit.

3. An impurity scavenging system in accordance with claim 1, wherein said condenser is arranged upward of said scavenging unit.

4. An impurity scavenging system in accordance with claim 1, wherein said condenser is arranged independently of said scavenging unit and connected with said scavenging unit in series.

5. An impurity scavenging system in accordance with claim 2, wherein said condenser is arranged independently of said scavenging unit and connected with said scavenging unit in series.

6. An impurity scavenging system in accordance with claim 1, further comprising:
    a second pumping means which pumps the liquid in said cleaning liquid line;
    a cleaning liquid discharging line, one end of which is connected with said impurity scavenging unit and another end of which is connected with said cleaning liquid line at the upstream side of the second pumping means;
    a second valve having ports, two of which are arranged in series in the cleaning liquid discharging line;
    a liquid adjusting line, one end of which is inserted into said impurity scavenging unit and another end of which is connected with another one of the ports of the second valve;
    the end of said liquid adjusting line inserted into the impurity scavenging unit opens at a level equal to the specified level of the surface of the scavenging liquid of the impurity scavenging unit; and
    the end of said cleaning liquid discharging line connected with the impurity scavenging unit is connected at the bottom of the impurity scavenging unit.

7. An impurity scavenging system in accordance with claim 2, further comprising:
    a second pumping means which pumps the liquid in said cleaning liquid line;
    a cleaning liquid discharging line, one end of which is connected with said impurity scavenging unit and another end of which connected with said cleaning liquid line at the upstream side of the second pumping means;
    a second valve having ports, two of which are arranged in series in the cleaning liquid discharging line;

a liquid adjusting line, one end of which is inserted into said impurity scavenging unit and another end of which is connected with another one of the ports of the second valve;

the end of said liquid adjusting line inserted into the impurity scavenging unit opens at a level equal to the specified level of the surface of the scavenging liquid of the impurity scavenging unit; and the end of said cleaning liquid discharging line connected with the impurity scavenging unit is connected at the bottom of the impurity scavenging unit.

8. An impurity scavenging system in accordance with claim 3, further comprising:

a second pumping means which pumps the liquid in said cleaning liquid line;

a cleaning liquid discharging line, one end of which is connected with said impurity scavenging unit and another end of which is connected with said cleaning liquid line at the upstream side of the second pumping means;

a second valve having ports, two of which are arranged in series in the cleaning liquid discharging line;

a liquid adjusting line, one end of which is inserted into said impurity scavenging unit, and another end of which is connected with another one of the ports of the second valve;

the end of said liquid adjusting line inserted into the impurity scavenging unit which opens at a level equal to the specified level of the surface of the scavenging liquid of the impurity scavenging unit; and the end of said cleaning liquid discharging line connected with the impurity scavenging unit is connected at the bottom of the impurity scavenging unit.

9. An impurity scavenging system in accordance with claim 5, further comprising:

a second pumping means which pumps the liquid in said cleaning liquid line;

a cleaning liquid discharging line, one end of which is connected with said impurity scavenging unit and another end of which is connected with said cleaning liquid line at the upstream side of the second pumping means;

a second valve having ports, two of which are arranged in series in the cleaning liquid discharging line;

a liquid adjusting line, one end of which is inserted into said impurity scavenging unit and another end of which is connected with another one of the ports of the second valve;

the end of said liquid adjusting line inserted into the impurity scavenging unit opens at a level equal to the specified level of the surface of the scavenging liquid of the impurity scavenging unit; and the end of said cleaning liquid discharging line connected with the impurity scavenging unit is connected at the bottom of the impurity scavenging unit.

10. An impurity scavenging system in accordance with claim 1, further comprising:

introducing valves, each of which have ports, two of which are arranged in series in said gas introduction line;

gas supplying lines for supplying gases to be processed, each end of which is connected with a port of said introducing valves, except for one valve which is arranged closest to said impurity scavenging unit, thereby selectively enabling a connection from one of said gas supplying lines to said gas introduction line;

a bypass line which connects another port of one of said introducing valves closest to the impurity scavenging unit, thereby selectively enabling a connection from said gas supplying line to said scavenging unit and a connection from said gas supplying line to the discharging line arranged in the downstream side of the condenser.

11. An impurity scavenging system in accordance with claim 2, further comprising:

introducing valves, each of which have ports, two of which are arranged in series in said gas introduction line;

gas supplying lines for supplying gases to be processed, each end of which is connected with a port of said introducing valves, except for the one valve which is arranged closest to said impurity scavenging unit, thereby selectively enabling a connection from one of said gas supplying lines to said gas introduction line;

a bypass line which connects another port of one of said introducing valves closest to the impurity scavenging unit, thereby selectively enabling a connection from said gas supplying line to said scavenging unit and a connection from said gas supplying line to the discharging line arranged in the downstream side of the condenser.

12. An impurity scavenging system in accordance with claim 3, further comprising:

introducing valves, each of which have ports, two of which are arranged in series in said gas introduction line;

gas supplying lines for supplying gases to be processed, each end of which is connected with a port of said introducing valves, except for the one valve which is arranged closest to said impurity scavenging unit, thereby selectively enabling a connection from one of said gas supplying lines to said gas introduction line;

a bypass line which connects another port of one of said introducing valves closest to the impurity scavenging unit, thereby selectively enabling a connection from said gas supplying line to said scavenging unit and a connection from said gas supplying line to the discharging line arranged in the downstream side of the condenser.

13. An impurity scavenging system in accordance with claim 5, further comprising:

introducing valves, each of which have ports, two of which are arranged in series in said gas introduction line;

gas supplying lines for supplying gases to be processed, each end of which is connected with a port of said introducing valves, except for the one valve which is arranged closest to said impurity scavenging unit, thereby selectively enabling a connection from one of said gas supplying lines to said gas introducing line;

a bypass line which connects another port of one of said introducing valves closest to the impurity scavenging unit, thereby selectively enabling a connection from said gas supplying line to said scavenging unit and a connection from said gas supplying line to the discharging line arranged in the downstream side of the condenser.

14. An impurity scavenging system in accordance with claim 6, further comprising:

introducing valves, each of which have ports, two of which are arranged in series in said gas introduction line;

gas supplying lines for supplying gases to be processed, each end of which is connected with a port of said introducing valves, except for the one valve which is arranged closest to said impurity scavenging unit, thereby selectively enabling a connection from one of said gas supplying lines to said gas introduction line;

a bypass line which connects another port of one of said introducing valves closest to the impurity scavenging unit, thereby selectively enabling a connection from said gas supplying line to said scavenging unit and a connection from said gas supplying line to the discharging line arranged in the downstream side of the condenser.

15. An impurity scavenging system in accordance with claim 7, further comprising:

introducing valves, each of which have ports, two of which are in series arranged in said gas introduction line;

gas supplying lines for supplying gases to be processed, each end of which is connected with a port of said introducing valves, except for the one valve which is arranged closest to said impurity scavenging unit, thereby selectively enabling a connection from one of said gas supplying lines to said gas introduction line;

a bypass line which connects another port of one of said introducing valves closest to the impurity scavenging unit, thereby selectively enabling a connection from said gas supplying line to said scavenging unit and a connection from said gas supplying line to the discharging line arranged in the downstream side of the condenser.

16. An impurity scavenging system in accordance with claim 10, further comprising:

a third valve having ports, two of which are arranged in series in the discharging line on the downstream side of the connecting point of said bypass line and said discharging line; and a toxicant scavenging unit connected to another port of the third valve.

17. An impurity scavenging system in accordance with claim 11, further comprising:

a third valve having ports, two of which are arranged in series in the discharging line on the downstream side of the connecting point of said bypass line and said discharging line;

a toxicant scavenging unit connected to another port of the third valve.

18. An impurity scavenging system in accordance with claim 14, further comprising:

a third valve having ports, two of which are arranged in series in the discharging line on the downstream side of the connecting point of said bypass line and said discharging line;

a toxicant scavenging unit connected to another port of the third valve.

19. An impurity scavenging system in accordance with claim 15, further comprising:

a third valve having ports, two of which are arranged in series in the discharging line on the downstream side of the connecting point of said bypass line and said discharging line;

a toxicant scavenging unit connected to another port of the third valve.

* * * * *